United States Patent [19]

Kumata

[11] Patent Number: 4,606,707
[45] Date of Patent: Aug. 19, 1986

[54] PUMP APPARATUS HAVING TWO DRIVE MOTORS

[75] Inventor: Hirotaka Kumata, Tokorozawa, Japan

[73] Assignee: Honda Giken Kogyo Kabushiki Kaisha, Tokyo, Japan

[21] Appl. No.: 736,791

[22] Filed: May 22, 1985

[30] Foreign Application Priority Data

Jun. 27, 1984 [JP] Japan ................................. 59-132723

[51] Int. Cl.$^4$ .......................... F04B 17/00; H02K 7/00
[52] U.S. Cl. .................................. 417/354; 417/365; 417/410; 310/67 R; 310/112
[58] Field of Search ................. 417/410, 354, 423 R, 417/359, 365, 361, 357; 418/268; 310/67, 112

[56] References Cited

U.S. PATENT DOCUMENTS

| 399,822 | 3/1889 | Blades | 417/410 X |
| 2,557,879 | 6/1951 | Lewis et al. | 417/410 X |
| 2,648,786 | 8/1953 | Kritter | 417/410 X |
| 3,223,043 | 12/1965 | Shapiro | 417/410 X |
| 3,961,864 | 6/1976 | Pabst et al. | 417/354 |
| 4,128,364 | 12/1978 | Pabst et al. | 417/354 |
| 4,505,654 | 3/1985 | Dean et al. | 418/268 X |

FOREIGN PATENT DOCUMENTS

| 54-157305 | 12/1979 | Japan | 417/410 |
| 75082 | 5/1946 | Norway | 417/351 |
| 594849 | 11/1947 | United Kingdom | 417/410 |
| 699436 | 11/1953 | United Kingdom | 417/410 |
| 428140 | 5/1975 | U.S.S.R. | 417/410 |

Primary Examiner—Carlton R. Croyle
Assistant Examiner—Theodore W. Olds
Attorney, Agent, or Firm—Roberts, Spiecens & Cohen

[57] ABSTRACT

A pump apparatus comprising a rotary pump including a rotatable shaft having opposite ends to which are drivingly connected a pair of brushless motors. A rotor is secured to the shaft and is mounted within a pump chamber. A drive circuit is connected to the brushless motors to drive the same in synchronism. All of the above components are contained in a casing.

18 Claims, 4 Drawing Figures

PUMP APPARATUS HAVING TWO DRIVE MOTORS

FIELD OF THE INVENTION

The present invention relates to a motor-driven pump, and particularly to a fuel pump for use with automobiles and motorcycles.

DESCRIPTION OF PRIOR ART

Typical conventional pumps include rotary pumps such as vane pumps driven by brush motors.

The conventional pumps have the following drawbacks due to the use of brush motors.
  (a) the sliding contact in the brush motor reduces the torque at the output shaft, with the result that the output is small compared with the power consumption;
  (b) the sliding contact wears the brushes, shortening its life;
  (c) sparks produced near the brushes may cause undesired effects such as, electromagnetic noise in electronic devices mounted on automobiles such as the control circuit of an electronic fuel injector; and
  (d) because of the adverse effects of sparks, there are restrictions in mounting the pump apparatus.

SUMMARY OF THE INVENTION

An object of the invention is to provide a pump having improved performance which is driven by a pair of brushless motors.

In order to satisfy the above and further objects, the pump of the invention comprises a rotary pump having a rotor secured to the rotating shaft in the pump chamber; a pair of brushless motors, each coupled to a respective end of the rotating shaft of the rotary pump; and a drive circuit to activate the brushless motors, all these components being installed inside a pump casing.

The pair of brushless motors are driven by the drive circuit, causing the rotating shaft to turn and the rotary pump to take in and deliver the fluid.

BRIEF DESCRIPTION OF THE FIGURES OF THE DRAWING

One embodiment of this invention is illustrated in the appended drawing, wherein.

DETAILED DESCRIPTION

Figure 1:
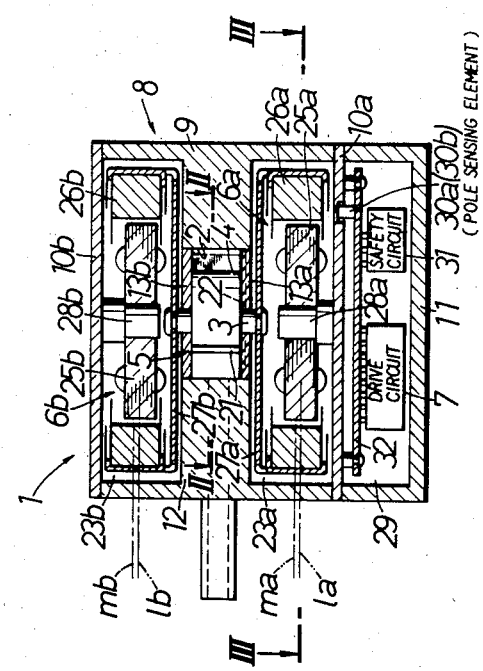
FIG. 1 is a longitudinal cross section of the embodiment according to the invention.

In FIG. 1 there is seen a pump apparatus 1 according to the invention which comprises a vane pump 5 constituting a rotary pump including a rotor 4 secured to a rotatable shaft 3 and disposed in a pump chamber 2; a pair of brushless motors 6a, 6b coupled to opposite ends of the shaft 3 of the vane pump 5; a drive circuit 7 for driving the brushless motors 6a, 6b, all these components being installed inside a pump casing 8.

The casing 8 is essentially composed of a cylindrical casing body 9, a pair of end plates 10a, 10b closing both ends of the casing body 9; and a bottom cylindrical cover 11 covering end plate 10a. The casing body 9 has a radially inwardly projecting, integral flange 12 extending annularly at the axially central part of the inner surface of the body 9. The amount of radial inward projection of flange 12 varies along the circumference to form a hole at the center of the internal flange 12 which is eccentric to the casing 8. Plates 13a, 13b are press fit into the ends of the hole in flange 12, so as to close the ends of the hole. The flange 12 and the plates 13a, 13b define pump chamber 2 eccentric to the casing 8.

Figure 2:
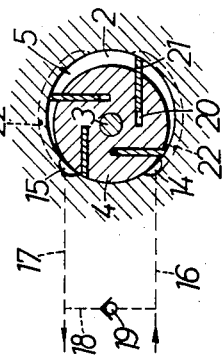
FIG. 2 is a cross section taken along line II—II in FIG. 1.

Referring also to FIG. 2, the rotor 4 of the vane pump 5 is contained in the pump chamber 2 and is secured to the rotatable shaft 3. The shaft 3 is coaxial with the casing 8 and is rotatably supported by the plates 13a, 13b. The axial end surfaces of the rotor 4 are in sliding contact with the plates 13a, 13b. The internal flange 12 of the casing body 9 has an inlet or intake port 14 and a delivery or discharge port 15 cut in the inner side surface of the pump chamber 2 at different positions along its circumference. Respectively connected to the intake and delivery ports 14, 15 are intake and delivry passages 16 and 17 formed in the casing body 9 and illustrated diagrammatically in FIG. 2. A connecting pipe 18 is connected to passages 16 and 17 at an intermediate position therein. The connecting pipe is provided with a one-way relief valve 19.

A multiple number of guide grooves 20 (four are shown in FIG. 2) are cut axially in the rotor 4 from one end surface thereof to the other. The four guide grooves 20 are arranged equidistantly along the rotor circumference and are open at the outer peripheral surface of the rotor 4. The guide grooves 20 are disposed around the rotating shaft 3 so as to extend perpendicularly to each other when viewed in a plane normal to the rotating shaft 3.

A vane blade 21 is slidably engaged in each guide groove 20. As the rotating shaft 3 and the rotor 4 begin to turn, the vane blades 21 rotate therewith while sliding on the internal peripheral surface of the pump chamber 2 thereby drawing the fluid into the pump chamber from the intake port 14 and discharging the fluid at the delivery port 15.

An adjustment groove 22 is formed at one end surface of the rotor 4 in the surface of the plate 13a, in order to prevent the formation of a gap between the internal side surface of the pump chamber 2 and the vane blade 21, which might occur if the projection of the vane blade 21 from the rotor 4 is insufficient when the vane blade 21 passes the intake port 14 and enters the intake stroke. The function of the adjustment groove 22 is to provide communication between the bottom of the guide groove 20 when its vane blade 21 is in the intake stroke with the bottom of the adjacent guide groove 20 when its vane blade 21 is in the delivery stroke. As a result, the vane blade 21 in the intake stroke is pushed outward by the back fluid pressure which is produced as the adjacent vane blade 21 in the delivery stroke is pushed into the guide groove 20, thereby ensuring reliable sliding contact between the vane blade and the internal peripheral surface of the pump chamber 2. The adjustment groove 22 also has the function of releasing the back pressure on the vane blade 21 in the delivery stroke, so that is prevents excess force from acting upon the vane blade 21 in the delivery stroke.

The casing body 9 and the end plates 10a, 10b define motor chambers 23a, 23b located, when viewed in axial direction (FIG. 1), on each side of the vane pump 5. In the motor chambers 23a, 23b are installed brushless motors 6a, 6b respectively, both of which are basically identical in construction. In the following description, only the construction of the brushless motor 6a will be described in detail with subscript "a" for the components. The structure of the other brushless motor 6b is shown in the drawing with subscript "b" for the corresponding components.

Figure 3:
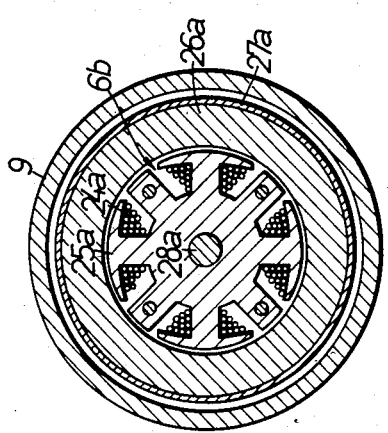
FIG. 3 is a cross section taken along the line III—III in FIG. 1.

Referring further to FIG. 3, the brushless motor 6a consists of a stator 25a and a rotor 27a. The stator 25a is secured, coaxially with the rotatable shaft 3, to the end plate 10a and has multiple phase coils 24a (in this embodiment two-phase, four-pole) wound thereon with circumferential spacing between the coils. The rotor 27a has a permanent magnet 26a which has, for example, six poles surrounding the stator 25a and is secured to the end of the rotatable shaft 3.

The stator 25a is secured to a stay 28a projecting coaxially with the rotatable shaft 3 from the internal surface of the end plate 10a. The rotor 27a is basically formed as a cylinder with a closed bottom, and the permanent magnet 26a is of ring-shape and is secured to the inner surface of the cylinder and surrounds the stator 25a. The permanent magnet 26a and the stator 25a are so disposed that the center ma of the axial length of the permanent magnet 26a does not coincide with but deviates from the center la of the axial length of the stator 25a. More specifically, the relative positions of the permanent magnet 26a and the stator 25a is axially closer to the vane pump 5 than is the center la of the stator 25a.

In the other brushless motor 6b, the relative positions of the permanent magnet 26b and the stator 25b are such that the center mb of the permanent magnet 26b is axially farther from the vane pump 5 than is the center lb of the stator 25b.

The arrangement wherein the centers ma, mb of the axial length of the permanent magnets 26a, 26b are axially shifted in the same direction from the centers la, lb of the stators 25a, 25b, eliminates the tendency of the rotors 27a, 27b to move with fluctuation in the axial direction during operation. That is, since the magnets 26a, 26b are urged by magnetic attraction toward the stators 25a, 25b, the rotors 27a, 27b are urged downwardly, when viewed in FIG. 1, along the axis of the rotatable shaft 3, thereby preventing fluctuating movement of the rotors 27a, 27b. As a result, axial fluctuating movement of the rotor 4 caused by the fluctuation of the rotors 27a, 27b is prevented. This, in turn, eliminates adverse effects such as pulsating delivery of fluid that might otherwise be caused by the fluctuating movement of the rotor 4.

The rotors 27a, 27b of the brushless motors 6a, 6b are both secured to each end of the rotating shaft 3 and therefore the circumferential relative position of the poles between permanent magnets 26a, 26b is kept constant.

End plate 10a and the cover 11 define a circuit chamber 29, in which are installed a drive circuit 7 for driving the brushless motors 26a, 26b, pole sensing elements 30a, 30b for detecting the position of the magnetic poles of the permanent magnets 26a, 26b in brushless motors 6a, 6b, and a safety circuit 31 for the drive circuit 7. The drive circuit 7 and the safety circuit 31 are formed on a printed circuit card 32 secured to the end plate 10a. Pole sensing element 30a is provided on the end plate 10a to detect the position of the magnetic poles of the permanent magnet 26a in brushless motor 6a.

Pole sensing element 30b detects the position of the poles of the permanent magnet 26b in the other brushless motor and is mounted on the end plate 10a at a different position than the element 30a. This is because it is possible to determine the pole position of permanent magnet 26b by detecting the pole position of the other magnet 26a since the relative pole position between the magnets 26a, 26b is constant.

Figure 4:
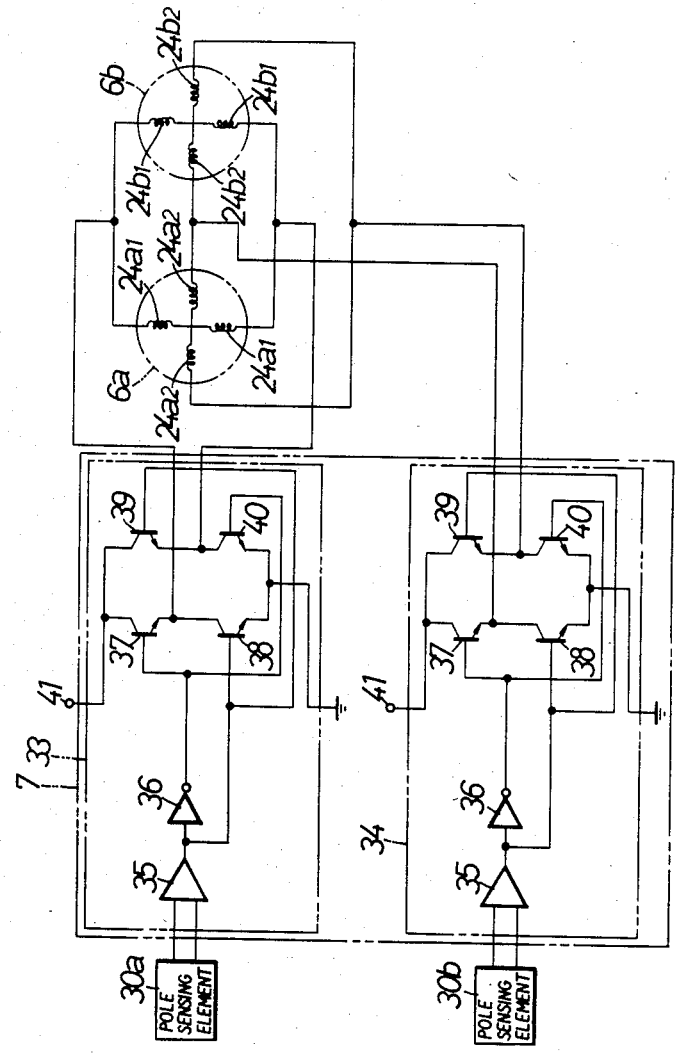
FIG. 4 is an electric circuit diagram showing the construction of the drive circuit.

In FIG. 4, the drive circuit 7 is seen to comprise first and second drive units 33, 34 of the same construction. The first drive unit 33 energizes coils 24a1, 24b1 of one phase in the brushless motors 6a, 6b according to the magnetic pole detection signal from pole sensing element 30a. The second drive unit 34 energizes coils 24a2, 24b2 of the other phase in the two brushless motors 6a, 6b, according to the magnetic pole detection signal from the other pole sensing element 30b.

The first drive unit 33 consists of a comparator 35, an amplifier 36, and four transistors 37, 38, 39, 40. The detection signal from the pole sensing element 30a is supplied to the comparator 35. Two series circuits, one made up of transistors 37, 38 and the other of transistors 39, 40, are connected in parallel between terminal 41 of the power source and ground. The output of the comparator 35 is connected to the base of the transistors 38, 39 and, through the amplifier 36, to the base of the transistors 37, 40. Coils 24a1 and 24b1 are connected in parallel respectively between transistors 37 and 38 and between transistors 39 and 40.

The second drive unit 34, as with the first drive unit 33, consists of a comparator 35, an amplifier 36, and four transistors 37, 38, 39, 40. The detection signals of the pole sensing element 30b are fed to the comparator 35. Coils 24a2, 24b2 are connected in parallel respectively between transistors 37 and 38 and between transistors 39 and 40.

In the drive circuit 7, upon detection of a magnetic pole by one pole element 30a, the transistors 37, 40 of the first drive unit 33 conduct, energizing the coils 24a1, 24b1. When the other pole sensing element 30b detects the magnetic pole, the transistors 37, 40 of the second drive unit 34 conduct, energizing the coils 24a2, 24b2. In this way, the single drive circuit 7 performs the same-phase, synchronous driving of the two brushless motors 6a, 6b.

Next, the operation of this embodiment is described. When the drive circuit 7 energizes two coils 24a, 24b of the same phase synchronously, rotational force is applied to the rotors 27a, 27b. As the rotors 27a, 27b turn with the rotatable shaft 3, the vane pump 5 begins to operate, drawing fluid, such as fuel, into the pump chamber 2 from the intake passage 16 and delivering fuel from the delivery passage 17 continuously.

In such pump apparatus 1, the vane pump 5 is driven by the brushless motors 6a, 6b at both sides thereof and therefore the operating torque of the pump is high, making it possible to increase the pump's delivery pressure. Furthermore, the use of the brushless motors 6a, 6b eliminates problems that might be created when conventional brush motors are used, such as reduced torque, reduced durability, and the adverse effects of sparks on electronic devices.

Moreover, since the two brushless motors 6a, 6b are of the same construction, the manufacturing costs can be reduced. The single drive circuit 7 is used in common for both brushless motors 6a, 6b and this reduces the required number of parts.

In another embodiment of this invention, a trochoid pump may be used as the rotary pump in place of the vane pump. In this case, an inner rotor with external teeth is secured to the rotating shaft 3 and an outer rotor with internal teeth engaged with the external teeth of the inner rotor is fitted into the internal flange 12 of the casing body 9.

The pump apparatus of this invention can be employed not only to pump fuel but other fluids as well.

Since the pump apparatus of this invention consists of the rotary pump with the rotor secured to the rotatable shaft contained in the pump chamber, the pair of brushless motors coupled to each end of the rotatable shaft of the rotary pump, and the drive circuit to drive the brushless motors, all these being installed in the casing, it is possible to increase the fluid delivery pressure and thereby improve performance and avoid adverse effects of electronic devices. With this invention, therefore, a pump apparatus is obtained which is small in size compared to the high delivery pressure and which has high performance. Also there is no restriction regarding its mounting position.

Although the invention has been described in relation to a specific preferred embodiment thereof, it will become apparent to those skilled in the art that numerous modifications and variations can be made without departing from the scope and spirit of the invention as defined in the attached claims.

What is claimed is:

1. A pump apparatus comprising:
   a casing with an axis, said casing including an annular wall having an inner surface and an internal flange portion which projects radially inwardly from said wall to an axially central portion thereof, and opposite closed end walls, said internal flange portion and said end walls cooperatively defining a pair of motor chambers in the casing on opposite sides of said flange portion;
   a rotary pump including a rotatable shaft having opposite ends projecting into the pair of motor chambers and a rotor secured to said shaft, said shaft and said rotor being disposed within a pump chamber defined within said internal flange;
   a pair of brushless motors respectively disposed in said motor chambers, said motors each including a motor stator mounted on a respective one of said end walls and a motor rotor drivingly connected to the projecting end of said rotatable shaft for integral rotation therewith and in concentric relation with the respective stator;
   and drive circuit means for driving said brushless motors;
   the motor stator and the motor rotor of each pair of motors being axially offset from each other in the same direction as the other pair to apply axial force to said rotatable shaft opposing axial fluctuation thereof during rotation.

2. A pump apparatus as claimed in claim 1, wherein said drive circuit is installed in a circuit chamber defined by one of the closed end walls and a cylindrical cover secured to said one end wall.

3. A pump apparatus as claimed in claim 2, wherein the motor stator of each of the motors includes coils and the motor rotor includes permanent magnets, and two poles sensing elements connected to said drive circuit are disposed in said circuit chamber and are mounted on said one closed end wall at different positions.

4. A pump apparatus as claimed in claim 1, wherein each of the motor rotors is cylindrical and has one closed axial end to which is secured the respective end of the rotatable shaft, said motor rotor including magnets fixed to a cylindrical inner peripheral surface thereof in a radially face-to-face relationship relative to the motor stator which is centrally located within the cylindrically disposed magnets.

5. A pump apparatus as claimed in claim 2 wherein said pump chamber is eccentrically offset from said casing.

6. A pump apparatus as claimed in claim 1 wherein said rotor comprises a rotor body and a plurality of slidable vanes mounted in said body.

7. A pump apparatus as claimed in claim 6 wherein said rotor body has an axis of rotation which is axially offset in said pump chamber, said vanes extending axially in slots provided in said rotor body and being radially slidable in said slots for projecting beyond the periphery of said rotor body.

8. A pump apparatus as claimed in claim 7 wherein said casing has intake and delivery ports communicating with said pump chamber and arranged relative to said vanes such that as the rotor rotates, fluid is drawn into the pump chamber through the intake port and delivered under pressure from the delivery port.

9. A pump apparatus as claimed in claim 8 wherein said casing is provided with a groove to establish communication between the slots of adjacent vanes.

10. A pump apparatus as claimed in claim 1 wherein said casing forms a circuit containing said drive circuit.

11. A pump apparatus as claimed in claim 3 wherein said drive circuit includes a power supply, first and second drive units respectively connected to said power supply, to the coils of the stators of the motors and to said pole sensing elements to drive the motor rotors according to signals from said pole sensing elements.

12. A pump apparatus as claimed in claim 11 wherein said drive circuit includes, for each motor and its associated pole sensing element, a comparator connected to said pole sensing element and switching means connected to said comparator to connect the power supply to the coils of the stator of the motor in accordance with the signals from the pole sensing elements.

13. A pump apparatus as claimed in claim 12 wherein said switching means comprises pairs of transistors connected to respective pairs of coils of the stator of the motor.

14. A pump apparatus as claimed in claim 13 comprising an amplifier connected to said comparator, one pair of transistors being connected to the output of the comparator, the other pair of transistors being connected to the output of the amplifier.

15. A pump apparatus as claimed in claim 13 wherein each pole sensing element is associated with two pairs of transistors connected in parallel to said power source, the pairs of transistors for each pole sensing element being connected to the coils of the stators.

16. A pump apparatus as claimed in claim 15 wherein said coils are multiphase in each stator, the coils of each phase in the two stators being connected in parallel to the pairs of transistors of a respective one of the pole sensing elements.

17. A pump apparatus as claimed in claim 1 wherein said drive circuit means includes means operatively connected to said motors to drive the same in synchronism.

18. A pump apparatus as claimed in claim 1 wherein said motors include multi-phase coils, said drive circuit means being connected to the coils of the same phase of said motor for energizing said coils synchronously.

* * * * *